L. B. HARVEY.
DRIVING MEANS FOR DEMOUNTABLE RIMS.
APPLICATION FILED JULY 31, 1920.
1,412,111.
Patented Apr. 11, 1922.
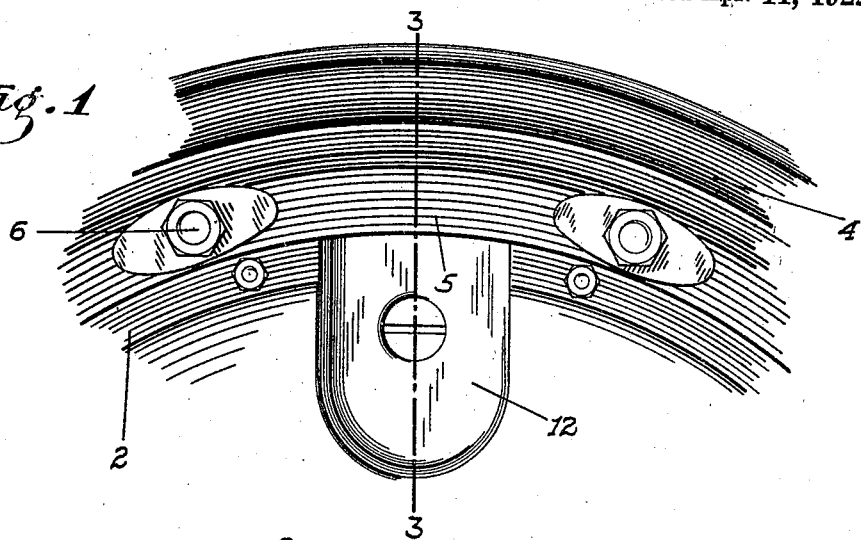
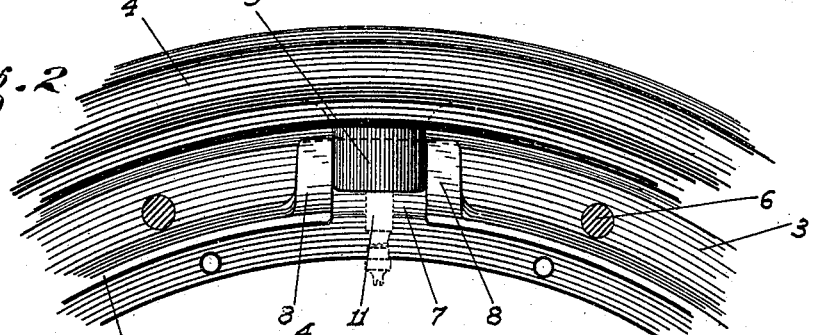
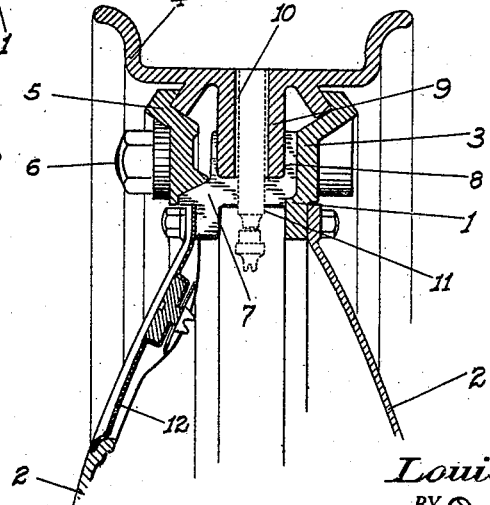
INVENTOR.
Louis B. Harvey
BY
ATTORNEY

UNITED STATES PATENT OFFICE.

LOUIS B. HARVEY, OF BUFFALO, NEW YORK, ASSIGNOR TO HARVEY RIM & WHEEL COMPANY, INC., OF BUFFALO, NEW YORK.

DRIVING MEANS FOR DEMOUNTABLE RIMS.

1,412,111.   Specification of Letters Patent.   Patented Apr. 11, 1922.

Application filed July 31, 1920. Serial No. 400,439.

*To all whom it may concern:*

Be it known that I, LOUIS B. HARVEY, a citizen of the United States, residing at Buffalo, county of Erie, State of New York, have invented certain new and useful Improvements in Driving Means for Demountable Rims; and I do declare the following to be a full, clear, and exact description of the same, reference being had to the accompanying drawings, and to the characters of reference marked thereon, which form a part of this application.

This invention relates to a driving means between the fixed and demountable rims of a wheel, the principal object being to form a lug on the demountable rim which will cooperate with lugs on the fixed rim in such a manner that the two rims can have no relative peripheral movement when once placed together.

Another object is to utilize the lug on the demountable rim as a protecting sleeve for the tire-valve stem, and to so form the fixed rim adjacent the lugs thereon that the demountable rim, with the tire carried thereby, may be slid onto the fixed rim without the necessity of lifting the tire and its rim in order to enable the valve stem to clear the fixed rim.

On account of this latter construction, this device is especially adapted to be used for truck wheels using pneumatic tires, since these latter are very large and heavy, and it is no light task to lift these heavy tires and rims to position them on the wheel.

The construction employed is also especially intended to be incorporated in a wheel using discs secured directly to the fixed rim instead of spokes and a felly. I also aim to use my improved demountable rim as shown in my co-pending application for Patent #284,983, filed March 25th, 1919, and an air valve hand-hole plate substantially as shown in my Patent No. 1,338,177, dated April 27th, 1920, while the form of fixed rim and locking ring for the demountable rim is as shown in my co-pending application, Serial No. 402,079, filed August 9th, 1920.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Fig. 1 is a fragmentary side elevation of a wheel structure, viewed from the outer face of the same.

Fig. 2 is a similar view with the outer disk and valve hand-hole plate removed.

Fig. 3 is a cross section on a line 3—3 of Fig. 1.

Referring now more particularly to the characters of reference on the drawings, the numeral 1 denotes the fixed rim to the opposite and inner edges of which are fixed the discs 2 of the wheel.

A vertical flange 3 projects outwardly from the inner edge of the rim and is adapted to seat thereon one flange of the demountable rim 4, this latter being of the type shown in the aforementioned application for patent thereon. A continuous locking ring 5 engages the opposite side of the demountable and fixed rims, being clamped in engagement therewith by means of bolts 6.

The fixed rim 1 is provided with a transverse recess or slot 7 extending from the outer edge to the flange 3, while outwardly projecting and parallel lugs 8 are formed with said rim extending transversely thereof, one on each side of and adjacent said recess, these lugs terminating short of the outer periphery of the flange 3.

The demountable rim 4 is formed with an inwardly projecting boss 9 adapted to seat snugly between the lugs 8 and provided with a central orifice 10 to receive the valve stem 11 of the tire therethrough.

An air-valve hand hole plate 12 of the type shown in the aforementioned patent is mounted in the outer one of the discs 2 in alinement with the valve 11, which projects between the discs and beyond the boss 9, said plate being cut radiallly to conform to the curvature of the inner edge of the locking ring 5 and terminating thereagainst, so that when the wheel and its co-operating parts are assembled, the locking ring covers a portion of the rim-slot 7, while the plate 12 covers the remainder.

In this manner, an unbroken appearance is had from the outside of the wheel, while by removing the locking ring and valve plate, the demountable rim and tire may be removed from the wheel by slipping the same off without raising or offsetting the same in any way.

From the foregoing description it will be readily seen that I have produced such a device as substantially fulfills the object of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:—

In combination, a fixed rim, a demountable rim adapted to be mounted thereon, a transverse slot provided in the fixed rim and open from the outer edge thereof, lugs projecting outwardly from the sides of said slot, a boss on the demountable rim adapted to seat between said lugs, and a locking ring for the demountable rim adapted to pass across the outer face of the slot to normally conceal the same.

In testimony whereof I affix my signature.

LOUIS B. HARVEY.